United States Patent Office 3,173,933
Patented Mar. 16, 1965

3,173,933
OXIDATION OF ALCOHOLS AND ETHERS TO CARBONYL CONTAINING COMPOUNDS
Allan S. Hay, Schenectady, N.Y., assignor to General Electric Company, New York, N.Y., a corporation of New York
No Drawing. Filed Jan. 22, 1962, Ser. No. 167,957
21 Claims. (Cl. 260—413)

This application is a continuation-in-part of my copending application, Serial No. 641,844, filed February 25, 1957, now abandoned, which is assigned to the same assignee as the present invention.

This invention relates to the oxidation of aliphatic, including cycloalpihatic alcohols and ethers, including acetals (hereinafter referred to generally as "alkyl compounds"). More particularly, this invention relates to a process of preparing carbonyl containing alkyl compounds which comprises reacting alkyl compounds with oxygen as an oxidizing agent in the presence of a catalyst soluble in the reaction mixture and consisting essentially of cobalt, bromine and a carboxylic acid.

Heretofore, specific oxidizing systems have been employed to oxidize specific aliphatic and cycloaliphatic alcohols, ethers, acetals, etc. However, no general method for employing oxygen to oxidize all of these compounds to carbonyl derivatives under moderate reaction conditions has been disclosed.

Unexpectedly, I have now discovered a general method whereby alkyl, including cycloalkyl alcohols, and ethers, including acetals, can be readily oxidized with oxygen or air to form carbonyl containing compounds. This process, which occurs under moderate reaction conditions, comprises reacting these compounds in a liquid phase with oxygen in the presence of a catalyst soluble in the reaction mixture and consist essentially of cobalt, bromine and a carboxylic acid. The catalyst for this reaction is so unique and specific that the omission or substitution of one component renders it substantially inactive. Thus, the omission of bromine or the complete substitution of other closely related components, such as copper for cobalt, iodine for bromine, etc., renders the catalyst inactive.

In carrying out the process of the present invention, a solution is made of the alkyl compound in a suitable solvent, which also contains dissolved therein a catalyst consisting essentially of cobalt, bromine, and a carboxylic acid (also referred to as the "cobalt-bromine-carboxylic catalyst" or "catalyst"). The solvent preferably is the same compound as at least one of the products of the oxidation reaction, or it may be a carboxylic acid forming part of the catalyst system, such as acetic or propionic acid. The solution in a suitable reaction vessel is heated to reaction temperature. Oxygen is then passed into the reaction mixture at the desired rate for the desired period of time. After the reaction is completed, the oxygenated products are separated from the reaction mixture by conventional methods. The process can also be carried out in a continuous manner by continuously adding both alkyl compound and oxygen to a solution of the cobalt-bromine-carboxylic catalyst in a solvent. Alternately, a part of the catalyst can be present in one part of the system while the other part of the catalyst is added with a reactant. Thus, the cobalt constituent can be present in the solvent and the bromine constituent added with the alkyl compound. By reusing the mother liquid of a prior run in a subsequent run, one can continuously reuse the catalyst.

The term "alkyl compound" as used in the present invention refers to an organic compound containing an aliphatic or a cycloaliphatic radical attached to an alcohol, ether or acetal radical. The term includes compounds of the formula R—X where R is an alkyl radical, for example, methyl, ethyl, propyl, butyl, pentyl, hexyl, heptyl, octyl, nonyl, decyl, octadecyl and isomers and homologues thereof including cycloalkyl radicals, for example, cyclopropyl, cyclobutyl, cyclopentyl, cyclohexyl, cycloheptyl, and isomers and homologues thereof; and X is an alcohol, i.e., —OH radical, or an ether radical, including an acetal radical. Thus, the term is seen to include alkyl alcohols, for example, methanol, ethanol, propanol, butanol, pentanol, hexanol, heptanol, octanol, nonanol, decanol octadecanol, etc., isomers and homologues thereof; alkyl ethers, for example, diethyl ether, dipropyl ether, dibutyl ether, dipentyl ether, dihexyl ether, diheptyl ether, dioctyl ether, etc., isomers and homologues thereof, as well as mixed alkyl ethers, for example, ethyl propyl ether, ethyl butyl ether, butyl pentyl ether and the like. The term includes the above compounds which contain mixed or polyfunctional groups, for example, dihydroxy, hydroxy-ether, diethers as well as diethers of the acetal type, for example, diethoxymethane, dibutoxymethane, etc. In addition the term includes cycloalkyl alcohols, ethers and acetals corresponding to the above compounds where a cycloalkyl group is substituted for the alkyl group, for example, cyclopentanol, cyclohexanol, etc.; dicyclohexyl ether, ethyl cyclohexyl ether, tetrahydrofurane, dioxane, tetrahydrofurfuryl alcohol, etc., and isomers and homologues thereof. The term "alkyl alcohol" as used in the specification and claims includes the straight chain aliphatic, branched chain aliphatic and cycloaliphatic alcohols and the term "ether" includes both ethers and acetals.

By the process of the present invention it is possible to prepare a wide variety of carbonyl containing products, for example, acids, esters, anhydrides, ketones, etc. As a general rule oxygen attacks the hydrogen-carbon bond of the carbon bonded to the oxygen of the alcohol, ether, or acetal radical. For example, it is possible to prepare caproic acid and hexyl caproate from hexanol; butyric acid and butyl butyrate from butyl ether; acetone from isopropanol; heptanone and mixed lower aliphatic acids from 3-heptanol; acetoxydecanoic acid, 10-hydroxy-decanoic acid and sebacic acid from 1,10-decanediol.

Although I do not wish to be bound by theory, it is believed that cobalt, bromine and carboxylic acid constituents of the catalyst combine in some unusual manner to produce the unique catalyst of this invention. All of these components are essential to produce an active catalyst. The combination is so unique that the substitution of other elements for one or more component either totally stops or substantially impedes the reaction. Thus, little catalytic action is obtained when appreciable amounts of other substances which usually make excellent oxidation catalysts are present during the reaction. For example, the presence of appreciable amounts of dissolved cationic compounds of iron, copper, etc. in the reaction mixture substantially stops the reaction. Similarly, the presence of appreciable amounts of anions, such as sulfate, nitrate, chlorate, etc. ions inhibit the activity of this unique catalyst. These substances interfere with the reaction only when present in ionic form and then because they react with the catalyst to form cobalt compounds which are not catalytically reactive. Therefore, they only completely inactivate the catalyst when they are present in amounts which are chemically quivalent to the amount of cobalt present as the catalyst. Compounds which contain such groups as substituents which do not produce these groups in ionic form during the reaction will not interfere with the reaction and, if they do not produce such ions in sufficient quantity to completely inactivate the catalyst, they will retard but not stop the reaction. Because of this, I prefer to use a reaction mixture, including the catalyst system which is essentially free of any components which impede the reaction. The substitution of other halogens, such as chlorine for bromine, imparts to the catalyst no appreciably greater catalytic activity, than is found in cobalt acetate, one of the usual prior art catalysts. The presence of iodine in elemental or ionic form completely inactivates the catalyst, but may be present in compounds, for example, as a nuclear substituent on aryl compounds, which do not release iodine in elemental or ionic form during the reaction.

The atomic ratio of cobalt to bromine is important for maximum reaction rates. Optimum reaction rates obtained when cobalt and bromine are present in substantially equiatomic amounts (i.e. 0.9–1.1 atoms of bromine per atom of cobalt). The rate of reaction decreases rapidly as the bromine-to-cobalt atomic ratio is increased, and conversely, as the bromine-to-cobalt atomic ratio is decreased from unity there is a decrease in activity although this decrease is less marked. I have found that a bromine-to-cobalt atomic ratio of 2, i.e., two atoms of bromine per atom of cobalt, substantially stops the reaction and that the reaction proceeds at a slow rate even at as low a ratio at 0.008. Although in practice I prefer to employ bromine-to-cobalt atomic ratios of about 0.3 to 1, ratios of 0.1 to 1.2 give satisfactory results. However, ratios of 0.008 to 1.9 can also be used. Although an initial bromine-to-cobalt atomic ratio of 2 substantially stops the reaction, bromine losses may occur during the reaction or during a continuous or a multi-cycle reaction wherein the mother liquor is continuously reused, thus permitting the addition of more bromine, if desired. However, the catalytically effective bromine-to-cobalt ratio should not be greater than 2.

The molar ratio of the carboxylic acid-to-cobalt has no upper limit with the result that carboxylic acids can be employed as solvents for the reaction. Although small amounts of carboxylic acids can be used to effect oxidation, for example in a molar ratio of about 2:1 in respect to cobalt, for optimum yields and rates it is preferable to employ larger amounts of carboxylic acid, preferably in solvent quantities.

The cobalt constituent of the catalyst is furnished by cobalt compounds in the divalent or trivalent state. Most simple cobalt salts can be isolated as stable solids only in the form of divalent salts, but trivalent cobalt salts such as cobaltic acetate, cobaltic hydroxide, cobaltic carbonate, are known. The latter two compounds and the corresponding cobaltous hydroxide and carbonate as well as the oxides of cobalt are a convenient source of cobalt for the catalyst when it is desired to use the same carboxylic acid formed as a product as the source of carboxylic acid constituent of the catalyst system. Specific divalent cobalt compounds include cobalt bromide and cobalt salts of carboxylic acids which may be the same or a different carboxylic acid used as the solvent. Where the reaction is carried out in the presence of a large amount of carboxylic acid, for example, acetic acid, cobalt, regardless of its initial form, generally takes the form of the salt of the carboxylic acid used as solvent in the reaction mixture, e.g., the acetate when acetic acid is the solvent. Therefore, any cobalt salt of the type described which is soluble in the solvent employed in an amount sufficient to form the catalyst and does not introduce interfering ions, is satisfactory for the process. Because of its availability, the preferred source of cobalt is cobaltous acetate tetrahydrate (also referred to as "Co(OAc)$_2$.4H$_2$O") which may be used in conjunction with cobalt bromide. However, other suitable cobalt catalysts include the cobaltous salts of other lower aliphatic acids, such as, for example, cobalt salts of the acids produced in the reaction, cobaltous propionate, cobaltous butyrate, cobaltous 2-chlorobutyrate, cobaltous hydroxystearate, cobaltous succinate, the mono-cobalt salt of succinic acid, the cobalt salt of the monoethyl ester of succinic acid, cobaltous levulinate, cobaltous tartrate, cobaltous ethoxybutyrate, etc. In addition, cobaltous salts of aromatic carboxylic acids may also be employed as catalysts. Thus, I can employ salts such as cobaltous benzoate, cobaltous (ethylthio)benzoate, cobaltous (methylsulfinyl)benzoate, cobaltous (phenylsulfonyl)benzoate, cobaltous fluorobenzoate, cobaltous chlorobenzoate, cobaltous bromobenzoate, cobaltous iodobenzoate, cobaltous toluate, cobaltous terephthalate, the mono-cobalt salt isophthalic acid, the cobalt salt of the monomethyl ester of o-phthalic acid, cobaltous naphthalenecarboxylate, etc. Inorganic cobalt salts of anions that inactivate the catalyst should be avoided, for example, cobalt salts containing sulfate, nitrate, iodide, iodate, chlorate, etc., ions.

The bromine constituent of the catalyst is generally furnished by bromine compounds containing bromine capable of being readily removed from the parent compound, i.e., compounds containing a labile bromine atom. Such compounds are precursors of bromine or hydrogen bromide, which is formed during the oxidation reaction to supply the bromine constituent of the catalyst. Specific compounds include the bromocarboxylic acids, for example, the bromoaliphatic acids, e.g., the bromoacetic acids, the bromopropionic acids, the bromobutyric acids, the bromosuccinic acids, etc., cycloaliphatic carboxylic acids containing removable bromine, for example α-bromocyclohexanecarboxylic acid, etc.; free bromine (i.e. Br$_2$); acid bromides, for example, acetyl bromide, etc.; bromocarbons containing bromine capable of being readily removed from the parent compound, for example, bromochloroform, etc.; hydrogen bromide, cobalt bromide, etc. I have found that one mole of HBr per mole of cobalt acetate produces an extremely active catalyst.

The carboxylic acid constituent of the catalyst is generally furnished by carboxylic acids or salts of carboxylic acids. Examples of carboxylic acids and salts comprise those carboxylic acids hereinafter mentioned as solvents and the previously mentioned cobalt salts containing carboxylate groups. Other sources of the carboxylic acid constituent comprise compounds capable of forming carboxylic acids in situ even in very small amounts, e.g., the starting materials which produce carboxylic acids by my reaction, acid anhydrides, acid bromides, etc.

A wide variety of solvents may be employed in the reaction with maximum yields being obtained with inert solvents which do not adversely affect the reaction and in which both reactant and catalyst are soluble, for example, aromatic and aliphatic hydrocarbons, esters, etc. However, solvents which are oxidized during the reaction, e.g., the starting material, ketones, etc., may likewise be used as solvents. When the starting material is used as solvent, the product becomes the solvent during the latter part of the reaction. Because carboxylic acids make excellent solvents for both the reactant and catalyst, they are the preferred solvents. Since carboxylic acids form part of the catalyst and there is no upper limit to the amount of carboxylic acid the reaction will tolerate, these solvents can be used as the source of the carboxylic acid constituent of the catalyst as well as the solvent. For obvious reasons, it is highly desirable to use a liquid carboxylic acid although solid carboxylic acid can be used in conjunction with other solvents or under liquefying conditions. Thus, benzoic acid dissolved in benzene or in the alkyl compound itself has been used as a combined solvent and source of carboxylic acid constituent of the catalyst system. Since many of the alcohols and ether starting materials produce carboxylic acids as products when oxidized by my process, it greatly simplifies the separation process to recover the final product if the same carboxylic acid as is formed as the product is also used as the source of the carboxylic acid portion of the catalyst and, if a liquid, also as the solvent. For example, in oxidizing primary alcohols, the products are carboxylic acids, e.g., acetic acid from ethanol, butyric acid from butanol, etc. Therefore, such products make excellent solvents for my oxidation process and at the same time furnish the carboxylic acid constituent of the catalyst. Other products of my oxidation process, for example the ketones, esters, etc., make excellent solvents but require the addition of a carboxylic acid for the catalyst system. Examples of other carboxylic acids comprise aliphatic carboxylic acids, for example, acetic, propionic, butyric, succinic, tartaric, levulinic, bromobutyric, etc., acids, cycloaliphatic carboxylic acids, for example, naphthenic acid, cyclohexanecarboxylic acid, etc. In addition, carboxylic acid precursors, such as carboxylic anhydrides for example acetic anhydride, etc. can also be employed. These anhydrides can serve as solvents and as a means for removing water and can furnish the carboxylic acid constituent of the catalyst. Mixtures of these acids with other solvents can also be employed, for example, mixtures of acetic acid with acetophenone, etc. As a class, the lower alphatic carboxylic acids are preferred as solvents when not using the products of the oxidation reaction as solvents. The specific lower carboxylic acids preferred are acetic and propionic acids.

From the above discussion it is seen that the catalyst constituents can be selected from a wide variety of starting materials. A single compound which would meet all the requirements of the catalyst would be a cobalt salt of both hydrogen bromide and a carboxylic acid, for example cobalt bromide acetate. However, these compounds are not readily available and offer no advantage over a binary mixture of equimolar amounts of a cobalt salt of a carboxylic acid, for example, cobalt acetate, etc., and a bromine compound, for example, cobalt bromide, hydrogen bromide, bromine, etc. All of these would give a ratio of one atom of bromine to one atom of cobalt, i.e., a bromine-to-cobalt ratio of 1, but by varying the proportions in the binary mixture any desired ratio may be obtained. Ternary mixtures may be used to form the catalyst. For example, cobalt oxides, hydroxides, or carbonates and a bromine compound, for example, hydrogen bromide, bromine, cobalt bromide, etc., may be dissolved in a carboxylic acid to produce the catalyst.

The rate of oxygen addition to the reaction is also not critical and may vary within any desired limits. Since the function of the oxygen is to oxidize the alkyl compound, the rate of reaction is dependent to some extent on the amount of oxygen present at any given time in the reaction mixture. Thus, the rate of reaction is faster with higher rate of oxygen addition than with lower rate of addition. Satisfactory results have been obtained adding oxygen to the reaction mixture at the rate of from 0.01 to 10, and preferably from 0.5 to 5 parts by weight of oxygen per hour per part of the alkyl compound. It should be understood that in addition to employing pure oxygen as the oxidizing agent in my process, it is also possible to employ any oxygen-containing gas in which the ingredient other than oxygen is inert under the conditions of the reaction. Thus, satisfactory results have been obtained employing air instead of pure oxygen in the feed gas to the reaction. In addition, the reaction proceeds satisfactorily employing mixtures of oxygen and inert gases, such as helium, neon, xenon, krypton, argon, etc. as diluents for the oxygen in the feed gas. However, in the preferred embodiment of my invention I employ either air or oxygen as the oxidizing agent.

Although the process of this invention proceeds at a rapid rate at atmospheric pressure, with certain alkyl compounds, it may be desirable to employ subatmospheric or superatmospheric pressures. Because of the low boiling points of some alkyl compounds, for example the low molecular weight alkyl alcohols and ethers, it may be desirable to increase reaction time and/or temperature by the use of superatmospheric pressure. On the other hand, where products are formed which are capable of further reaction, it may be advantageous to use subatmospheric pressure to remove the products as fast as they are formed.

The temperature of the reaction of the present invention may also vary within fairly wide limits. The reaction can occur with temperatures as low as room temperature (i.e. about 25° C.). However, I have found that at temperatures below about 70° C. the reaction proceeds at a relatively slow rate. Satisfactory results are obtained when running the reaction at temperatures from about 80° C. up to a temperature of about 160° C. However, I prefer to carry out the reaction at the reflux temperature of the reaction mixture. Where the reaction mixture contains a large amount of acetic acid as a solvent, and since this acid is generally the lowest boiling major constituent of the reaction mixture, it is found that the reflux temperature is near to the boiling point at atmospheric pressure of the acid, i.e., about 110–115° C.

In the oxidation of the alkyl compound to carbonyl groups one of the products of reaction is water. In carrying out the reaction, it is found that the presence of a large amount of water has an adverse effect on the rate of reaction. Thus, when an amount of water in excess of about 0.05 part by weight per part of solvent is allowed to accumulate, the reaction is substantially stopped. Therefore, I prefer to carry out the reaction under nearly anhydrous conditions and with a maximum of about 0.05 part water per part solvent (5% by weight). Minute traces of water are often desirable since these help solubilize the cobalt constituent of the catalyst, e.g. $Co(OAc)_2$. Thus, $Co(OAc)_2 \cdot 4H_2O$ is very soluble in acetic acid while anhydrous $Co(OAc)_2$ is only slightly soluble. However anhydrous $Co(OAc)_2$ is quite soluble in acetic acid when hydrogen bromide is present. The removal of water during the reaction is readily accomplished by allowing the water to distill from the reaction mixture as it is formed. The effect of water can also be minimized by keeping the ratio of the alkyl compound to solvent low. Azeotropic agents such as benzene, heptane, etc. and carboxylic acid anhydrides can also be used in removing water from the reaction mixture.

The catalyst will be effective in the oxidation of the alkyl compound regardless of the amount present in the reaction mixture at any given time. However, since oxidation is extremely rapid and water is a product of the reaction, a controlling factor on the rate of oxidation is the rate at which water is removed. Any amount of alkyl compound can be present during the reaction provided the water content of the reaction mixture is no greater than 5% by weight of solvent. In practice, I have obtained satisfactory results when employing in the starting mixture from 0.01 to 0.5 part by weight of the alkyl compound per part of solvent or by using the alkyl compound as its own solvent. Preferably my reaction mixture at the start contains from 0.02 to 0.3 part by weight of the alkyl compound per part of solvent. It is obvious that where the alkyl compound is not its own solvent the ratio of alkyl compound to solvent will vary during the course of the reaction since the aralkyl compound is being continuously oxidized. Slow addition of the alkyl compound to the reaction mixture is one method of keeping the water content low.

The following examples are illustrative of the practice of my invention and are not intended for purposes of limitation. In the examples all parts are by weight.

These examples are carried out according to the following general procedure. An alkyl compound, a solvent, and the catalyst were placed in a suitable reaction vessel to form a homogeneous solution which was brought to reaction temperature and stirred rapidly. At this time oxygen was passed into the reaction mixture. Water formed during the oxidation was removed from the reaction system by distillation during the course of the reaction. Specific variations from these procedures are indicated in the specific examples. In the examples the molality of bromine is calculated as monoatomic bromine (Br, atomic weight 79.916). The products of this invention were isolated by conventional techniques. The compounds in brackets ([ ]) indicate the source of the catalyst.

Example 1

This example illustrates the oxidation of an alkyl alcohol, the use of benzene as a solvent during the initial part of the reaction and the product of oxidation as the solvent during the latter part of the oxidation and the use of small amounts of acetic acid.

A reaction mixture of 150 parts of n-hexanol-1 and 50 parts of benzene, this mixture being 0.15 molal in respect to cobalt and 0.1 molal in respect to bromine

[Co(OAc)$_2$.4H$_2$O and CoBr$_2$.6H$_2$O]

was heated to reflux as oxygen at the rate of 84 parts/hour was passed into the reaction mixture for about two hours. The temperature of the reaction rose during the reaction from 89° C.–143° C. as benzene was distilled off. The reaction mixture was cooled, dissolved in ether, and the ether solution was washed first with dilute hydrochloric acid and then with dilute aqueous potassium carbonate. The ether solution was then dried and distilled to yield n-hexyl caproate. The aqueous carbonate layer was acidified with dilute hydrochloric acid, extracted with ether, dried and distilled to give caproic acid. Total yield of caproic acid (as acid and ester based on reacted n-hexanol-1) was 97%.

Example 2

This example illustrates the oxidation of n-octanol-1 using acetic acid as a solvent.

A reaction mixture of 20.6 parts of n-octanol-1 and 105 parts of acetic acid, the acetic acid being 0.1 molal in respect to cobalt and 0.075 molal in respect to bromine [Co(OAc)$_2$.4H$_2$O and HBr], was heated in a closed system to 38° C. as oxygen was passed into the reaction mixture (for two hours) as fast as it was absorbed to yield n-octanoic acid and its ester.

Example 3

This example illustrates the oxidation of a secondary alkyl alcohol.

A reaction mixture of 15.7 parts of isopropanol and 105 parts of acetic acid, the acetic acid being 0.1 molal in respect to cobalt and 0.075 molal in respect to bromine [Co(OAc)$_2$.4H$_2$O and HBr], was heated to reflux as oxygen at the rate of 84 parts/hour was passed into the reaction mixture for 4 hours. A vapor chromatographic analysis of the distillate indicated a 70% yield of acetone based on isopropanol reacted.

Example 4

This example illustrates the oxidation of an alkyl ether and the use of benzoic acid and the material to be oxidized as a solvent for the reaction.

A reaction mixture of 50 parts of benzoic acid, 140 parts of di-n-butyl ether, this reaction mixture being 0.1 molal in respect to both cobalt and bromine

[Co(OAc)$_2$.4H$_2$O and CoBr$_2$.6H$_2$O]

was heated to reflux 130–133° C. as oxygen at the rate of 84 parts/hour was passed into the reaction mixture for two hours. The reaction mixture was distilled to yield a mixture of oxygenated products including about a 50% combined yield of butyric acid and butylbutyrate based on reacted di-n-butyl ether.

Example 5

This example illustrates the oxidation of a longer chain secondary alkyl alcohol in acetic acid.

A reaction mixture of 5.6 parts of n-heptanol-3 and 105 parts of acetic acid, the acetic acid being 0.1 molal in respect to cobalt and 0.075 molal in respect to bromine [Co(OAc)$_2$.4H$_2$O and HBr], was heated to 92° C. as oxygen was passed (for 3.5 hours) into a closed system as fast as it was absorbed to yield n-heptanone-3 and butyric acid.

Example 6

This example illustrates the oxidation of a polyfunctional alkyl compound, alkanediol, in acetic acid.

A reaction mixture of 26.15 parts of 1,10-decanediol and 105 parts of acetic acid, the acetic acid being 0.1 molal in respect to cobalt and 0.075 molal in respect to bromine [Co(OAc)$_2$.4H$_2$O and HBr], was heated to 90° C. as oxygen was passed in for 6 hours. From the reaction mixture was recovered acetoxydecanoic acid, 10-hydroxydecanoic acid and sebacic acid.

Example 7

This example illustrates the oxidation of an acetal.

A reaction mixture of 160 parts of di-n-butoxymethane, (C$_4$H$_9$O)$_2$CH$_2$, and a solvent containing 20 parts of benzoic acid and 50 parts of benzene, the reaction mixture being 0.1 molal in respect to both cobalt and bromine [CO(OAc)$_2$.4H$_2$O+CoBr$_2$.6H$_2$O], was heated to 140° C. as oxygen at the rate of 67 parts/hour was passed into the reaction mixture for 3.3 hours to yield 130 parts of a mixture of oxygenated products including acids, esters, and other carbonyl compounds.

Although the foregoing examples have described a number of variations and modifications of the proportions of ingredients and reaction conditions which may be employed in the practice of the present invention, it should be understood that my reaction is also applicable to reactants, reaction conditions, and proportions of ingredients which are not specifically illustrated by the examples.

The oxygenated alkyl compounds prepared by the method of this invention exhibit the same utility as the same compounds prepared by any other method. Thus, the acids may be esterified to serve as plasticizers for resinous materials, such as polyvinyl chloride, polyvinyl acetate, etc. Dibasic acids prepared by my process may be reacted with polyhydric alcohols in conventional methods to form polyester resins.

The ketones prepared by my process can be used in perfumes, as solvents for various systems, for example, in coating, vinyl, vinyl-modified, etc. resin systems. They may also be used in the synthesis of chemicals and perfumes, as solvents for lacquers, gums, resins, nitrocellulose, etc.

From the foregoing it is evident that a facile, unique and versatile oxidation process has been described. The foregoing detailed description has been given for clearness of understanding only and no unnecessary limitations are to be understood therefrom. The invention is not limited to the exact details shown and described for obvious modifications will occur to those skilled in the art. For example, although the oxidation generally requires no external initiation from ozone, peroxides, hydroperoxides, etc., the use of these expedients is not precluded.

What I claim as new and desire to secure by Letters Patent of the United States is:

1. The process of producing a carbonyl derivative of an alkyl compound selected from the group consisting of alkyl monohydric and diyhdric alcohols and alkyl mono- and di-ethers, wherein the carbonyl oxygen is attached to the same carbon atom as the OH group of said alcohols and the ether oxygen of said ethers, which comprises reacting oxygen with said alkyl compound in a reaction mixture containing dissolved therein no more than 5 percent by weight water and also containing dissolved therein a soluble catalyst consisting essentially of a combination of a cobalt salt of a carboxylic acid and bromine having a bromine-to-cobalt atomic ratio of 0.008 to 1.9 atoms of bromine per atom of cobalt.

2. The process of claim 1 in which the same compound as at least one of the products produced in the oxidation reaction is employed as a solvent.

3. The process of claim 1 in which a lower aliphatic carboxylic acid is employed as a solvent and the catalyst is a combination of a cobalt salt of a lower aliphatic carboxylic acid and bromine.

4. The process of claim 1 in which the catalyst is a combination of a cobalt salt of a hydrocarbon carboxylic acid and bromine.

5. The process of producing a carbonyl derivative of an alkyl compound selected from the group consisting of alkyl monohydric and dihydric alcohols and alkyl mono- and di-ethers, wherein the carbonyl oxygen is attached to the same carbon atom as the OH group of said alcohols and the ether oxygen of said ethers, which comprises reacting oxygen with said alkyl compound in a reaction mixture containing dissolved therein no more than 5 percent by weight water and also containing dissolved therein a soluble catalyst consisting essentially of a combination of a cobalt salt of a carboxylic acid and bromine having a bromine-to-cobalt atomic ratio of 0.1 to 1.2 atoms of bromine per atom of cobalt.

6. The process of producing a carbonyl derivative of an alkyl compound selected from the group consisting of alkyl monohydric and dihydric alcohols and alkyl mono- and di-ethers, wherein the carbonyl oxygen is attached to the same carbon atom as the OH group of said alcohols and the ether oxygen of said ethers, which comprises reacting oxygen with said alkyl compound in a reaction mixture containing dissolved therein no more than 5 percent by weight water and also containing dissolved therein a soluble catalyst consisting essentially of a combination of a cobalt salt of a hydrocarbon carboxylic acid and bromine having a bromine-to-cobalt atomic ratio of 0.1 to 1.2 atoms of bromine per atom of cobalt.

7. The process of claim 6 in which the same compound as at least one of the products of the oxidation reaction is employed as a solvent.

8. The process of claim 6 in which an acid selected from the group consisting of acetic and propionic acids is used as a solvent and the catalyst is a combination of bromine and a cobalt salt of a carboxylic acid selected from the group consisting of acetic and propionic acids.

9. The process of claim 6 in which the catalyst is a combination of a cobalt salt of an alkyl carboxylic acid and bromine.

10. The process of claim 6 in which the alkyl compound is an alkyl monohydric alcohol.

11. The process of claim 6 in which the alkyl compound is n-octanol-1.

12. The process of claim 6 in which the alkyl compound is isopropanol.

13. The process of claim 6 in which the alkyl compound is n-heptanol-3.

14. The process of claim 6 in which the alkyl compound is 1,10-decanediol.

15. The process of claim 6 in which the alkyl compound is a dialkyl mono-ether.

16. The process of claim 6 in which the alkyl compound is di-n-butylether.

17. The process of claim 6 in which the alkyl compound is an alkyl diether in the form of an alkyl acetal.

18. The process of claim 6 in which the alkyl compound is di-n-butoxymethane.

19. The process of claim 6 in which cobalt acetate and hydrogen bromide are used as the catalyst.

20. The process of claim 6 in which cobalt acetate and cobalt bromide are used as the catalyst.

21. The process of producing a carbonyl derivative of an alkyl compound selected from the group consisting of alkyl monohydric and dihydric alcohols and alkyl mono- and di-ethers, wherein the carbonyl oxygen is attached to the same carbon atom as the OH group of said alcohols and the ether oxygen of said ethers, which comprises reacting oxygen with said alkyl compound in a reaction mixture containing dissolved therein no more than 5% by weight water and also containing dissolved therein a catalyst consisting essentially of a combination of a cobalt salt of a carboxylic acid and bromine and being present in an amount which is greater than the chemically equivalent amount of ions which inactivate the cobalt, said catalyst having a bromine-to-cobalt atomic ratio of 0.008 to 1.9 atoms of bromine per atom of cobalt.

No references cited.

CHARLES P. PARKER, *Primary Examiner.*

A. H. WINKELSTEIN, D. D. HORWITZ, *Examiners.*